United States Patent
Sun et al.

(10) Patent No.: US 12,401,975 B2
(45) Date of Patent: Aug. 26, 2025

(54) COMMUNICATION METHOD, APPARATUS, AND SYSTEM

(71) Applicant: HUAWEI TECHNOLOGIES CO., LTD., Guangdong (CN)

(72) Inventors: Haiyang Sun, Beijing (CN); Fangyuan Zhu, Beijing (CN); Yaxin Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 355 days.

(21) Appl. No.: 17/883,862

(22) Filed: Aug. 9, 2022

(65) Prior Publication Data
US 2022/0386229 A1    Dec. 1, 2022

Related U.S. Application Data

(63) Continuation of application No. PCT/CN2020/140749, filed on Dec. 29, 2020.

(30) Foreign Application Priority Data

Feb. 17, 2020 (CN) .......................... 202010096911.4

(51) Int. Cl.
  *H04W 4/50* (2018.01)
  *H04L 41/0894* (2022.01)
  (Continued)

(52) U.S. Cl.
  CPC ........... *H04W 4/50* (2018.02); *H04L 41/0894* (2022.05); *H04W 48/08* (2013.01); *H04W 48/18* (2013.01); H04L 41/0895 (2022.05); H04L 41/40 (2022.05)

(58) Field of Classification Search
  CPC . H04L 41/0894; H04L 41/0895; H04L 41/40; H04W 4/50; H04W 48/08; H04W 48/12; H04W 48/18; H04W 72/23
  See application file for complete search history.

(56) References Cited

U.S. PATENT DOCUMENTS

2019/0029065 A1* 1/2019 Park ..................... H04W 60/00
2019/0215729 A1* 7/2019 Oyman ............... H04L 65/1016
(Continued)

FOREIGN PATENT DOCUMENTS

CN    106572516 A    4/2017
CN    107197486 A    9/2017
(Continued)

OTHER PUBLICATIONS

SA WG2 Meeting #121,S2-173362,23.501 P-CR: Network Slicing Update for supporting standalone NSSF plus miscellaneous changes to the existing text. ,ZTE, Telecom Italia, Oracle, ETRI, May 15-19, 2017, HangZhou, China, total 9 pages.

*Primary Examiner* — Nathan S Taylor

(57) ABSTRACT

Embodiments of this application provide a communication method, device, and system. The method includes: A terminal device receives first information from a network device, where the first information includes identification information of a first network slice and information about a first radio resource for accessing the first network slice. The terminal device accesses the first network slice based on the first information by using the first radio resource. According to this method, a success rate of accessing a slice can be improved, so that user experience is improved.

15 Claims, 11 Drawing Sheets

(51) Int. Cl.
    *H04W 48/08*    (2009.01)
    *H04W 48/18*    (2009.01)
    *H04L 41/0895*  (2022.01)
    *H04L 41/40*    (2022.01)

(56) References Cited

U.S. PATENT DOCUMENTS

| | | | |
|---|---|---|---|
| 2019/0289528 A1* | 9/2019 | Lou | H04W 76/11 |
| 2020/0008139 A1* | 1/2020 | Lai | H04W 48/16 |
| 2020/0120580 A1* | 4/2020 | Jin | H04W 72/54 |
| 2020/0196263 A1* | 6/2020 | Heyn | H04W 56/0005 |
| 2021/0258865 A1* | 8/2021 | Park | H04W 48/16 |
| 2022/0386229 A1* | 12/2022 | Sun | H04W 4/50 |

FOREIGN PATENT DOCUMENTS

| | | | | |
|---|---|---|---|---|
| CN | 109151906 A | 1/2019 | | |
| CN | 109219111 A | 1/2019 | | |
| CN | 109391648 A | 2/2019 | | |
| CN | 109792657 A | 5/2019 | | |
| CN | 109951877 A | 6/2019 | | |
| CN | 110226337 A | 9/2019 | | |
| CN | 110278096 A | 9/2019 | | |
| CN | 110380887 A | 10/2019 | | |
| CN | 110662261 A | 1/2020 | | |
| EP | 3512272 A1 | 7/2019 | | |
| GB | 2574815 A | * 12/2019 | | H04W 4/50 |
| WO | 2017174550 A1 | 10/2017 | | |
| WO | 2018027988 A1 | 2/2018 | | |
| WO | 2018228505 A1 | 12/2018 | | |

\* cited by examiner

COMMUNICATION METHOD, APPARATUS, AND SYSTEM

CROSS-REFERENCE TO RELATED APPLICATIONS

This application is a continuation of International Application No. PCT/CN2020/140749, filed on Dec. 29, 2020, which claims priority to Chinese Patent Application No. 202010096911.4, filed on Feb. 17, 2020. The disclosures of the aforementioned applications are hereby incorporated by reference in their entireties.

TECHNICAL FIELD

This application relates to the field of communication technologies, and in particular, to a communication method, apparatus, and system.

BACKGROUND

A network slice is a logically isolated network used to support a specific network capability and a specific network feature, and may include an entire end to end (E2E) network, or some network functions may be shared in a plurality of network slices. The network slice is a key technology that meets a network differentiation requirement of a 5th generation (5G) mobile communication technology proposed by the 3rd Generation Partnership Project (3GPP). Generally, network features of different network slices are different, and the network slices need to be isolated from each other to prevent mutual interference. For example, a network slice of an enhanced mobile broadband (eMBB) service may provide a transmission rate more than 10 times faster than that of 4G, and may be applied to currently popular augmented reality (AR) or virtual reality (VR), and high-definition video streaming. This enables a user to enjoy fast experience. A network slice of a massive machine-type communications (mMTC) service needs to support massive terminal access, but has small bandwidth and no requirement for a latency. A network slice of an ultra-reliable low-latency communication (URLLC) service features large bandwidth, a low latency, and high reliability, and may be applied to a 5G autonomous driving scenario.

Different network slices may correspond to different radio resources (for example, frequencies or frequency bands) that need to be accessed. For example, an eMBB-type slice needs to be accessed from 2.6 GHz or 4.9 GHz, and a URLLC-type slice needs to be accessed from 4.9 GHz. However, when a terminal device is performing initial access, or switches from an idle mode to a connected mode, the terminal device attempts to select a cell to access a network, based on a priority of configuration, or sequential scanning of different radio resources, or a radio resource accessed last time within specific time. The terminal device may fail to attempt to access a slice by using such a method.

SUMMARY

Embodiments of this application provide a communication method, apparatus, and system, to improve a success rate of accessing a slice, so that user experience is improved.

According to a first aspect, an embodiment of this application provides a communication method, where the method includes: A terminal device receives first information from a network device, where the first information includes identification information of a first network slice and information about a first radio resource for accessing the first network slice. The terminal device accesses the first network slice based on the first information by using the first radio resource.

For example, the identification information of the first network slice includes a type of the first network slice, single network slice selection assistance information for identifying the first network slice, or identification information of an instance of the first network slice.

For example, the information about the first radio resource indicates a frequency, a frequency, a frequency band, or a spectrum for accessing the first network slice, and the information about the first radio resource includes indication information of the first radio resource or index information of the first radio resource.

Therefore, according to the foregoing method, the terminal device may learn of a relationship between different network slices and radio resources corresponding to the different network slices. When accessing a network slice, the terminal device can access a requested network slice based on the information by using a correct radio resource, so that a slice access success rate can be ensured, and user experience can be improved.

In a possible design, the first information further includes a correspondence between location information of the terminal device and both the identification information of the first network slice and the information about the first radio resource. For example, the location information includes tracking area information, cell information, or base station information. Therefore, the terminal device may further learn of a relationship between different network slices in different areas and radio resources corresponding to the network slices. When accessing a network slice at different locations, the terminal device may access the requested network slice based on the information by using the correct radio resource, so that the slice access success rate can be ensured, and user experience can be improved.

In a possible design, the first network slice is a network slice requested by the terminal device, a network slice subscribed to by the terminal device, or a network slice configured by the terminal device. In other words, the network device may obtain all slices in a PLMN and radio resources corresponding to the slices. However, based on the network slice requested by the terminal device, the network slice subscribed to by the terminal device, or the network slice configured by the terminal device, the network device sends, to the terminal device, only a radio resource corresponding to the network slice requested by the terminal device, a radio resource corresponding to the network slice subscribed to by the terminal device, or a radio resource corresponding to the network slice configured by the terminal device, so that network resources are saved.

In a possible design, that a terminal device receives first information from a network device includes: The terminal device receives policy information from the network device, where the policy information includes the first information.

According to a second aspect, an embodiment of this application provides a communication method, where the method includes: A network device determines first information, where the first information includes identification information of a first network slice and information about a first radio resource for accessing the first network slice. The network device sends the first information to a terminal device, where the first information is used by the terminal device to access the first network slice by using the first radio resource.

For example, the identification information of the first network slice includes a type of the first network slice, single network slice selection assistance information for identifying the first network slice, or identification information of an instance of the first network slice.

For example, the information about the first radio resource indicates a frequency, a frequency, a frequency band, or a spectrum for accessing the first network slice, and the information about the first radio resource includes indication information of the first radio resource or index information of the first radio resource.

Therefore, according to the foregoing method, the terminal device may learn of a relationship between different network slices and radio resources corresponding to the different network slices. When accessing a network slice, the terminal device can access a requested network slice based on the information by using a correct radio resource, so that a slice access success rate can be ensured, and user experience can be improved.

In a possible design, the first information further includes a correspondence between location information of the terminal device and both the identification information of the first network slice and the information about the first radio resource. For example, the location information includes radio tracking area information, cell information, or base station information. Therefore, the terminal device may further learn of a relationship between different network slices in different areas and radio resources corresponding to the network slices. When accessing a network slice at different locations, the terminal device may access the requested network slice based on the information by using the correct radio resource, so that the slice access success rate can be ensured, and user experience can be improved.

In a possible design, the network device is a policy control function device. For example, that a network device determines first information includes:

The policy control function device receives second information from an access and mobility management function device, and determines the first information based on the second information, where the second information includes the identification information of the first network slice and the information about the first radio resource for accessing the first network slice.

Alternatively, the policy control function device sends location information of the terminal device to a network slice selection function device, receives second information from the network slice selection function device, and determines the first information based on the second information, where the second information includes the identification information of the first network slice and the information about the first radio resource for accessing the first network slice.

The first network slice is capable of providing a service for the terminal device at a location of the terminal device.

In another possible design, the network device is an access and mobility management function device. For example, that a network device determines first information includes:

The access and mobility management function device sends location information of the terminal device to a network slice selection function device, receives second information from the network slice selection function device, and determines the first information based on the second information, where the second information includes the identification information of the first network slice and the information about the first radio resource for accessing the first network slice. The first network slice is capable of providing a service for the terminal device at a location of the terminal device.

The access and mobility management function device receives the first information from an access network device.

In still another possible design, the network device is an access network device. For example, that a network device determines first information includes:

The access network device receives third information from an access and mobility management network element, where the third information includes a correspondence between the identification information of the first network slice and the information about the first radio resource for accessing first network slice, and a correspondence between identification information of a second network slice and information about a second radio resource for accessing the second network slice.

The access network device determines that the terminal device requests to access the first network slice, and determines the first information based on the third information.

In a possible design, the first network slice is a network slice requested by the terminal device, a network slice subscribed to by the terminal device, or a network slice configured by the terminal device. In other words, the network device may obtain all slices in a PLMN and radio resources corresponding to the slices. However, based on the network slice requested by the terminal device, the network slice subscribed to by the terminal device, or the network slice configured by the terminal device, the network device sends, to the terminal device, only a radio resource corresponding to the network slice requested by the terminal device, a radio resource corresponding to the network slice subscribed to by the terminal device, or a radio resource corresponding to the network slice configured by the terminal device, so that network resources are saved.

According to a third aspect, an embodiment of this application provides a communication apparatus, configured to implement the foregoing methods. The communication apparatus may be the terminal device in the first aspect, or an apparatus including the terminal device. Alternatively, the communication apparatus may be the network device in the second aspect, or an apparatus including the network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, an embodiment of this application provides a communication apparatus. The communication apparatus includes a processor and a memory. The memory is configured to store computer instructions. When the processor executes the instructions, the communication apparatus is enabled to perform the method according to any one of the foregoing aspects. The communication apparatus may be the terminal device in the first aspect, or an apparatus including the terminal device. Alternatively, the communication apparatus may be the network device in the second aspect, or an apparatus including the network device.

According to a fifth aspect, a communication apparatus is provided. The communication apparatus a processor. The processor is configured to: be coupled to a memory, and read instructions in the memory, to perform the method according to either of the foregoing aspects according to the instructions. The communication apparatus may be the terminal device in the first aspect, or an apparatus including the terminal device. Alternatively, the communication apparatus may be the network device in the second aspect, or an apparatus including the network device.

According to a sixth aspect, a computer-readable storage medium is provided. The computer-readable storage medium stores instructions, and when the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

According to an eighth aspect, a communication apparatus (for example, the communication apparatus may be a chip or a chip system) is provided. The communication apparatus includes a processor, configured to implement the function in any one of the foregoing aspects. In a possible design, the communication apparatus further includes the memory, and the memory is configured to store necessary program instructions and data. When the communication apparatus is a chip system, the communication apparatus may include a chip, or may include a chip and another discrete component.

According to a ninth aspect, a communication system is provided. The communication system includes:
 a network device, configured to: determine first information, where the first information includes identification information of a first network slice and information about a first radio resource for accessing the first network slice; and send the first information; and
 a terminal device, configured to: receive the first information from the network device, and access the first network slice based on the first information by using the first radio resource.

For technical effects brought by any one of the designs of the third aspect to the ninth aspect, refer to technical effects brought by different designs of the first aspect or the second aspect. Details are not described herein again.

DESCRIPTION OF EMBODIMENTS

Figure 1:
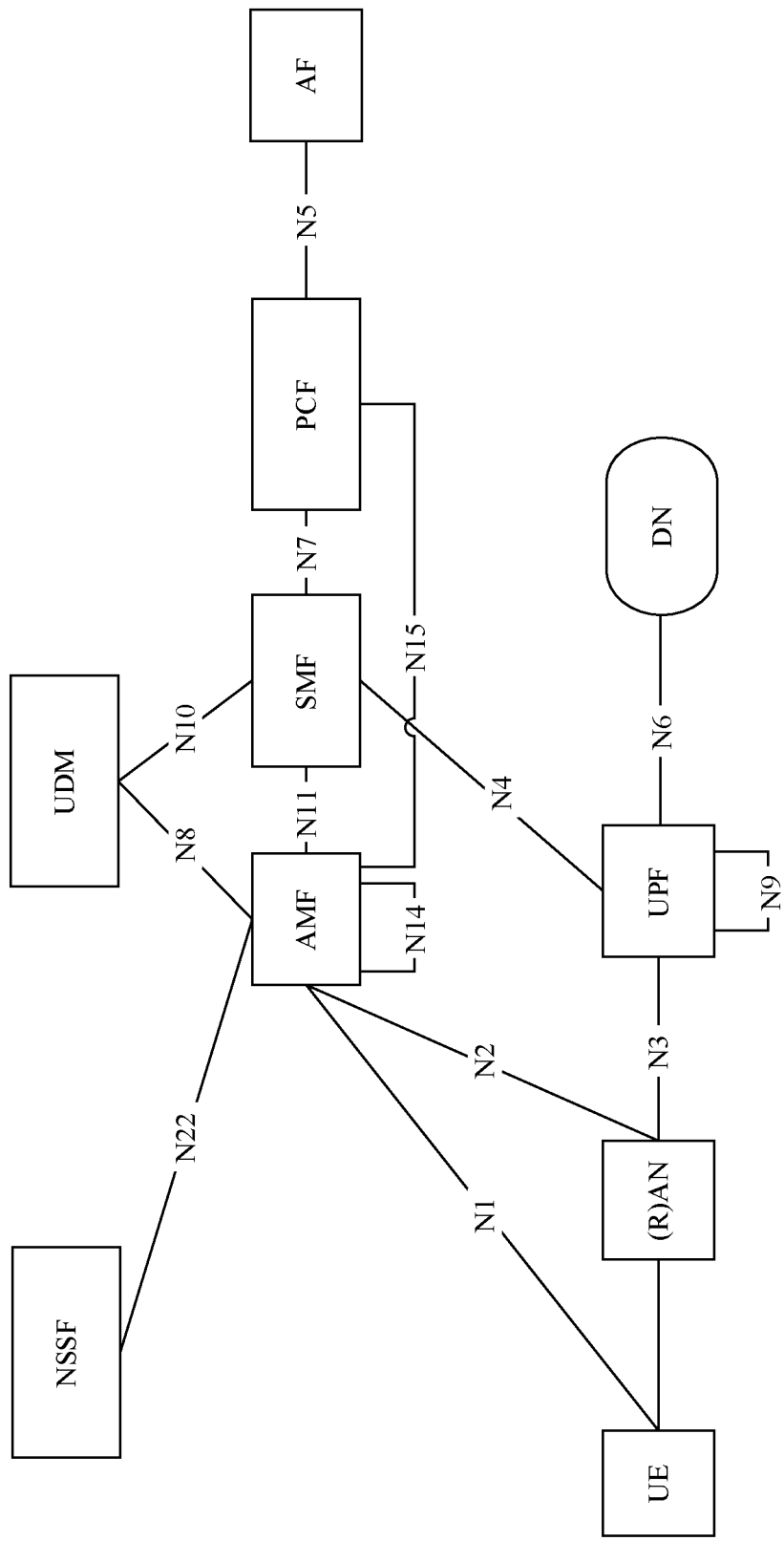
FIG. 1 is a schematic diagram of a 5G communication system according to an embodiment of this application.

The following describes the technical solutions in embodiments of this application with reference to the accompanying drawings in embodiments of this application. In descriptions of this application, unless otherwise specified, "at least one of the following" refers to any combination of these items, and includes any combination of a single item or a plurality of items. For example, at least one of a, b, or c may represent a, b, c, a and b, a and c, b and c, or a and b and c. Herein, a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, the term such as "for example" in embodiments of this application is used to represent giving an example, an illustration, or description. Any embodiment or design scheme described as "for example" in embodiments of this application should not be explained as being more preferred or having more advantages than another embodiment or design scheme. Exactly, use of the word such as "for example" is intended to present a related concept in a specific manner for ease of understanding.

The following first describes some concepts in this application.

1. Network Slice 5G will usher in an era of the internet of everything. 5G supports three major scenarios: eMBB, mMTC, and URLLC. The three major scenarios include diversified and differentiated applications.

eMBB: Breakthroughs in spectrum utilization and bandwidth technologies on a wireless network side enable 5G to provide a 10 times faster transmission rate than that of 4G. For currently popular AR/VR and high-definition video streaming, only the 5G ultra-high rate can meet requirements. The 4G transmission rate cannot meet the requirements. When the VR is used to watch an HD video or play a large interactive game, a network cable is required to obtain data. In the future, the VR/AR is capable of providing fast experience over wireless connection through a 5G network.

mMTC: With technologies such as multi-user shared access and heterogeneous ultra-dense network, 5G can support access of one million devices per square kilometer, which is 10 times that of 4G. With rapid development of smart cities, public facilities such as street lamps, manhole covers, and water meters have network connection capabilities and can be remotely managed. However, 5G will be more innovative. With a powerful connection capability of the 5G network, public devices in various industries in a city can be connected to an intelligent management platform. These public facilities collaborate with each other through the 5G network and can be managed by a small quantity of maintenance personnel, so that operation efficiency of the city is greatly improved.

URLLC: A most typical application for 5G is autonomous driving. In common scenarios of the autonomous driving, a plurality of channels of communication are performed simultaneously, such as emergency braking, vehicle to vehicle, vehicle to human, vehicle to infrastructure. In this case, a large amount of data processing needs to be performed instantaneously, and then decision-making needs to be performed. Therefore, a network requires ultra-high bandwidth, an ultra-low latency, and high reliability. The 5G network has a capability to deal with these scenarios.

In the 4G era, a single network is used to meet requirements of all application scenarios and customer groups. For example, to provide a narrowband internet of things (NB-IoT) capability, a corresponding NB feature is enabled on a network element. To build network reliability, a network element device—level redundancy backup is added and features are continuously overlaid to meet requirements of a mass market.

However, services in a vertical industry have different and unpredictable requirements in terms of latency, connection quantity, reliability, security, and the like. For example, an AR service requires ultra-bandwidth higher than 1600 Mbps, a power meter reading service requires a network to provide massive connections, and autonomous driving requires a low end to end latency at a millisecond level and high reliability of over 99.999%. It is impossible to address all these requirements and future requirements over one network.

A network slicing technology allows an operator to obtain a plurality of virtual networks in one hardware infrastructure through division, to meet different service requirements of various services through on-demand resource allocation and a flexible combination capability. When a new requirement is raised but a current network cannot meet the requirement, the operator only needs to virtualize a new slice network for the requirement without affecting an existing slice network, to launch a service at a fastest speed.

Network slicing means that a plurality of end to end networks are virtualized based on one piece of universal hardware by using the slicing technology. Each network provides a different network function to adapt to a different type of service requirement. After purchasing a physical resource, the operator uses the physical resource to virtualize an eMBB slice network for an internet access service, and uses the physical resource to further virtualize an mMTC slice network for a smart meter reading requirement of some vendors in the vertical industry. The two slice networks respectively provide services for different service scenarios.

Although various industries in the vertical industry have various requirements for network functions, these requirements can be parsed into requirements on network functions such as network bandwidth, connection quantity, latency, and reliability. The 5G standard also classifies network function requirements of different services into three typical scenarios. Network slice types corresponding to the three typical scenarios are an eMBB slice, an mMTC slice, and a URLLC slice respectively.

2. Single Network Slice Selection Assistance Information (S-NSSAI)

The S-NSSAI is used to identify a network slice. Based on an operation or deployment requirement of an operator, one S-NSSAI can be associated with one or more network slice instances, and one network slice instance can be associated with one or more pieces of S-NSSAI. For example, an eMBB slice 1, an eMBB slice 2, and an eMBB slice 3 are all eMBB-type slices, and S-NSSAI values of the eMBB slices are all 0x01000000. An eMBB+mMTC slice 4 may provide a service for both an eMBB-type service and an mMTC service. Therefore, the eMBB+mMTC slice 4 is both the eMBB-type slice and an mMTC-type slice, and S-NSSAI values corresponding to the eMBB+mMTC slice 4 are 0x01000000 and 0x02000000 respectively.

The S-NSSAI Includes a Slice/Service Type (SST) and a Slice Differentiator (SD)

The SST refers to an expected network slice behavior in terms of features and services. A standard value range of the SST is 1, 2, and 3. A value 1 indicates the eMBB; a value 2 indicates the URLLC; and a value 3 indicates a massive internet of things (MIoT).

The SD is optional information used to supplement the SST to distinguish between a plurality of network slices of a same slice/service type.

The SST and the SD are combined to indicate a slice type and the plurality of slices of the same slice type. For example, S-NSSAI values 0x01000000, 0x02000000 and 0x03000000 indicate an eMBB-type slice, a URLLC-type slice, and an MIoT-type slice respectively. S-NSSAI values 0x01000001 and 0x01000002 indicate eMBB-type slices that serve a user group 1 and a user group 2 respectively.

3. Network Slice Selection Assistance Information (NSSAI)

The NSSAI is a set of the S-NSSAI. NSSAI used in the 5G network includes requested NSSAI, allowed NSSAI, and configured NSSAI. Specific definitions of these NSSAI are described in Table 1.

TABLE 1

| NSSAI definition | |
|---|---|
| NSSAI | Definition |
| Requested NSSAI | The requested NSSAI is NSSAI that user equipment (UE) expects to use, is provided by the UE for a network side in a registration procedure, and includes a maximum of eight pieces of S-NSSAI. |
| Allowed NSSAI | The allowed NSSAI is provided by a public land mobile network (PLMN) for the UE in the registration procedure, and the like, indicates an S-NSSAI value that can be used by the UE in a current registration area of a serving PLMN, includes a maximum of eight pieces of S-NSSAI, and is stored locally by the UE. |
| Configured NSSAI | The configured NSSAI is NSSAI that is applicable to one or more PLMNs, is delivered to the UE by an access and mobility management function (AMF) in messages such as a registration accept or a configuration update command, includes a maximum of 16 pieces of S-NSSAI, and is stored locally by the UE. |

4. Network Slice Selection Policy (NSSP)

The NSSP is delivered to the UE by a PCF as a part of a UE route selection policy (URSP) rule through the AMF. The UE uses the NSSP to associate an application (for example, through an APP ID, an IP address, or a domain name) with the S-NSSAI.

5. Slice Selection Procedure

In a UE registration procedure, a radio access network (RAN) first selects an initial AMF for the UE based on locally stored information and a registration request message of the UE to serve the UE. However, the initial AMF may not support a network slice to be used by the UE. For example, the initial AMF supports only the URLLC-type network slice, but the UE requests the eMBB-type network slice. If the initial AMF cannot provide a service for the UE, the initial AMF queries the network slice selection function (NSSF) and selects a target AMF that supports the network slice of the UE, and then directly or indirectly sends the registration request message of the UE to the target AMF. The target AMF processes a registration request of the UE and then provides a network service for the UE. Specifically, the following steps may be included.

- Step 1: When the UE registers with a PLMN by using an access type, the UE sends a registration request message to the RAN. If the UE stores configured NSSAI of the PLMN or allowed NSSAI that is of the access type and that is of the PLMN, the UE carries requested NSSAI information in a non-access stratum (NAS) registration request message and an AN message. The requested NSSAI includes S-NSSAI of a slice that the UE expects to register with.
- Step 2: A RAN selects the initial AMF based on a globally unique AMF identifier (GUAMI) or the requested NSSAI. If the UE does not provide the requested NSSAI and the GUAMI in the AN message, the RAN sends the registration request message from the UE to a default AMF.
- Step 3: The initial AMF queries a unified data management (unified data management, UDM) to obtain UE subscription information including subscribed S-NSSAI. The initial AMF determines whether a service can be provided for the UE based on the received requested NSSAI and subscribed S-NSSAI, and a local configuration. If the AMF can serve the UE, the initial AMF is still a serving AMF of the UE. The AMF constructs the allowed NSSAI based on the subscribed S-NSSAI and requested NSSAI, and sends the allowed NSSAI back to the UE through the registration accept message. If the initial AMF cannot serve the UE or cannot make a decision, the AMF needs to query the NSSF.
- Step 4: The AMF sends information such as the requested NSSAI, the subscribed S-NSSAI, a PLMN of a subscription permanent identifier (SUPI), and a tracking area identity (TAI) to the NSSF for querying.
- Step 5: Based on the received information and the local configuration, the NSSF selects an AMF set or a candidate AMF list that can serve the UE and allowed NSSAI applicable to the access type, may further select a network slice instance serving the UE and a network repository function (NRF) that is used to select a network function (NF) in the instance, and sends the information to the initial AMF.
- Step 6: If the initial AMF is not in the AMF set and AMF address information is not stored locally, the initial AMF queries the NRF to obtain the candidate AMF list. The NRF returns a list of a group of available AMFs, including an AMF pointer and address information. The initial AMF selects an AMF from the list as the target AMF. If the initial AMF cannot obtain the candidate AMF list by querying the NRF, the initial AMF needs to send the registration request message of the UE to the target AMF through the RAN. The message sent by the initial AMF to the RAN includes the AMF set and the allowed NSSAI.
- Step 7: If the initial AMF determines to directly send a NAS message to the target AMF based on the local policy and the subscription information, the initial AMF sends, to the target AMF, the UE registration request message and other information, except the AMF set, that is obtained from the NSSF.

If the initial AMF determines to forward the NAS message to the target AMF through the RAN based on the local policy and the subscription information, the initial AMF sends a reroute (Reroute) NAS message to the RAN. The reroute NAS message includes target AMF set information, the registration request message, and related information that is obtained from the NSSF.

- Step 8: After receiving the registration request message sent in step 7, the target AMF continues with related steps of the registration procedure, and finally sends a registration accept message carrying information about the allowed NSSAI, the NSSP, and the like to the UE.

Different network slices may correspond to different radio resources that need to be accessed. For example, the eMBB-type slice needs to be accessed from 2.6 GHz or 4.9 GHz, and the URLLC-type slice needs to be accessed from 4.9 GHz, as shown in Table 2.

TABLE 2

| Slice type | Radio resource |
| --- | --- |
| eMBB | 2.6 GHz/4.9 GHz |
| URLLC | 4.9 GHz |

In addition, radio resources that need to be preferentially accessed by terminal devices that need to access different types of slices in different areas may also be different, as shown in Table 3. For example, for a same slice in an area 1 and an area 2, accessed spectrums are different. For example, a terminal device that uses only an eMBB-type service (eMBB only) slice preferentially accesses 2.6 GHz in the first area, and after moving to the second area, the terminal device preferably accesses the slice through 4.9 GHz. For a terminal device that uses only a URLLC-type service (URLLC only) slice, the terminal device may access the slice through 4.9 GHz in the first area, but cannot access the slice after moving to the second area. For a terminal device that can simultaneously use the eMBB-type and the URLLC-type service (eMBB and URLLC capable) slices, the terminal device accesses the slice in both the first area and the second area through 4.9 GHz.

TABLE 3

| | eMBB only UE | URLLC only UE | eMBB and URLLC capable UE |
| --- | --- | --- | --- |
| Area 1 | 2.6 GHz | 4.9 GHz | 4.9 GHz |
| Area 2 | 4.9 GHz | Null | 4.9 GHz |

In a current technology, when the terminal device is performing initial access, or switches from an idle mode to a connected mode, the terminal device attempts to select a cell to access a network, based on a priority of configuration, or sequential scanning of different radio resources, or a radio resource accessed last time within specific time. The terminal device may fail to attempt to access a slice by using such a method.

For example, with reference to Table 2, if the terminal device accesses the eMBB-type slice through 2.6 GHz last time and then enters the idle mode, when entering the connected mode again, the terminal device still accesses the network through 2.6 GHz, and cannot use the URLLC-type slice.

For another example, with reference to Table 3, the eMBB only terminal device accesses the network through 2.6 GHz last time and then enters the idle mode. When the terminal device moves from the area 1 to the area 2 and enters the connected mode again, the terminal device still accesses the network through 2.6 GHz. In this case, the terminal device cannot access an eMBB slice in the area 2.

This application provides the following embodiments, to improve a success rate of accessing a slice by UE, so that user experience is improved.

FIG. 1 is a schematic diagram of a 5G communication system according to an embodiment of this application. The communication system may include at least one of UE, a (R)AN device, an AMF device, a session management function (SMF) device, a user plane function (UPF) device, a policy control function (PCF) device, an NSSF device, an application function (application function, AF) device, and a UDM device.

A terminal device in embodiments of this application, for example, the UE shown in FIG. 1, may be a device configured to implement a wireless communication function. For example, the terminal device may be a device deployed on land, including an indoor device, an outdoor device, a handheld device, or a vehicle-mounted device; or may be deployed on the water (for example, on a ship); or may be deployed in the air (for example, on an airplane, a balloon, or a satellite). The terminal device may be UE, an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving, a wireless terminal in telemedicine (remote medical), a wireless terminal in a smart grid, a wireless terminal in transportation safety (transportation safety), a wireless terminal in a smart city, a wireless terminal in a smart home (smart home), or the like. The terminal device may be mobile or fixed.

An access network device in embodiments of this application, for example, the (R)AN device shown in FIG. 1, is a device that provides a wireless communication function for the terminal device. For example, a base station includes but is not limited to: a next generation NodeB (gNodeB, gNB), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (transmitting and receiving point, TRP), a transmission point (transmitting point, TP), a mobile switching center, and the like in 5G.

Main functions of a mobility management network element in embodiments of this application, for example, the AMF device shown in FIG. 1, include functions related to access and mobility, such as connection management, mobility management, registration management, access authentication and authorization, reachability management, and security context management.

A session management network element in embodiments of this application, for example, the SMF device shown in FIG. 1, is configured to perform session management in a mobile network, for example, session establishment, modification, and release. Specific functions include session-related functions such as allocating an interne protocol (IP) address to the terminal device, selecting a UPF that provides a packet forwarding function, service and session continuity (SSC) mode selection, and roaming.

Main functions of a user plane function network element in embodiments of this application, for example, the UPF device shown in FIG. 1, include functions related to a user plane such as data packet routing and transmission, packet detection, service usage reporting, QoS processing, lawful interception, uplink packet detection, and downlink data packet storage. The UPF may be connected to a data network (DN).

Main functions of a policy control function network element in embodiments of this application, for example, the PCF device shown in FIG. 1, include functions related to a policy, such as formulating a unified policy, providing policy control, and obtaining subscription information related to policy decision from a user data repository (UDR).

Main functions of a network slice selection function network element in embodiments of this application, for example, the NSSF device shown in FIG. 1, include: selecting a group of network slice instances for the UE, determining allowed NS SAI, determining an AMF set that can serve the UE, and the like.

An application function network element in embodiments of this application, for example, the AF device shown in FIG. 1, is responsible for interacting with a 3GPP core network to provide a service, including interacting with a network exposure function (NEF), interacting with a policy architecture, and the like.

A unified data management network element in embodiments of this application, for example, the UDM device shown in FIG. 1, supports authentication credential processing, user identity processing, access authorization, registration and mobility management, subscription management, short message service management, and the like in a 3GPP authentication and key agreement mechanism.

The foregoing network elements may be implemented by specified hardware, or may be implemented by a software instance on specified hardware, or may be implemented by a virtual function instantiated on an appropriate platform. This is not limited in the present invention.

In the service framework, a service-based interface is used on a control plane. For example, Namf is a service-based interface provided by an AMF network element. The AMF network element may communicate with another network function through the Namf. Nsmf is a service-based interface provided by an SMF. The SMF may communicate with another network function through the Nsmf. Nnssf is a service-based interface provided by an NSSF network element. The NSSF network element may communicate with another network function through the Nnssf. One function network element may open up its capability to another authorized function network element through a service-based interface, to provide a network function (NF) service. In other words, the NF service refers to various capabilities that can be provided.

In addition, embodiments of this application are also applicable to another future-oriented communication technology. Network architectures and service scenarios described in this application are intended to describe the technical solutions in this application more clearly, and do not constitute a limitation on the technical solutions provided in this application. Persons of ordinary skill in the art may know that: With evolution of network architectures and emergence of new service scenarios, the technical solutions provided in this application are also applicable to similar technical problems.

This application is applicable to a communication network in which a network slice is deployed. The network slice is a logically isolated network used to support a specific network capability and a network feature. In the following descriptions, the network slice is referred to as a slice for short.

Figure 2:
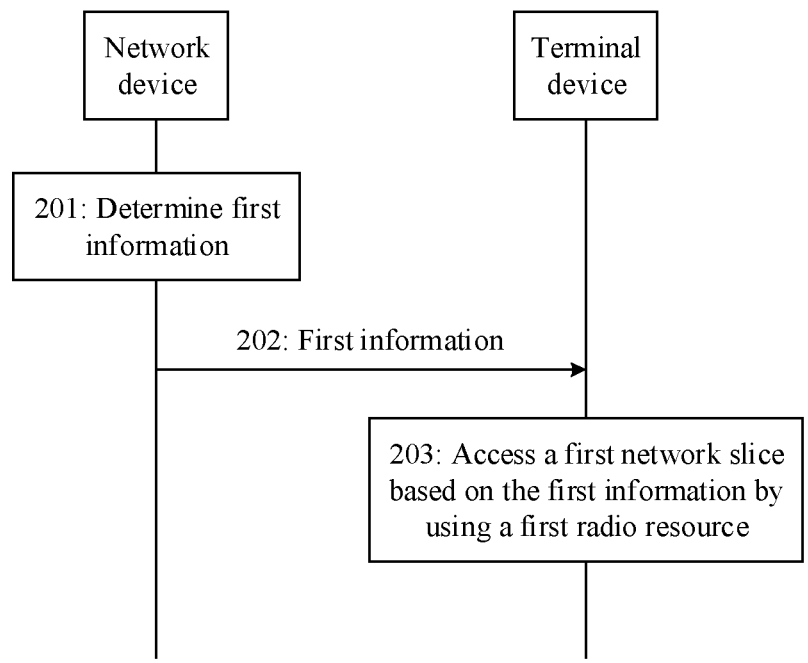
FIG. 2 is a schematic diagram of a communication method according to an embodiment of this application.

FIG. 2 is a signaling interaction diagram of a handover method according to an embodiment of this application. For example, the method includes the following steps:

Step 201: A network device determines first information, where the first information includes identification information of a first network slice and information about a first radio resource for accessing the first network slice.

For example, the first information may include a correspondence (which may also be referred to as a mapping relationship) between the identification information of the first network slice and the information about the first radio resource for accessing the first network slice, as shown in Table 4.

TABLE 4

| Identification information of the first network slice | Information about the first radio resource for accessing the first network slice |
|---|---|
| Identification information of a second network slice | Information about a second radio resource for accessing the second network slice |

For example, the identification information of the first network slice includes a type of the first network slice (the SST or the SD), single network slice selection assistance information (S-NSSAI) used to identify the first network slice, or instance identification information (slice instance ID) of the first network slice (where UE is required to be aware of a slice instance, for example, know a correspondence between a slice instance and S-NSSAI), or a combination of any several items. The information about the first radio resource indicates a frequency, a frequency, a frequency band, or a spectrum for accessing the first network slice, including indication information (for example, indicating 4.9 GHz or 2000 M-3000 MHz) of the first radio resource or index (index) information of the first radio resource.

For example, a resource allocated to an operator from the spectrum is a spectrum resource, for example, a spectrum resource from 2000 MHz to 3000 MHz. The frequency is a specific value in the spectrum, for example, 2000 MHz. A frequency channel number, a frequency band, and a frequency are all frequency-based concepts. The frequency channel number is a frequency range between a highest frequency of a signal that is allowed to be transmitted and a lowest frequency of the signal that is allowed to be transmitted, and is numbered, as shown in the first column of the following Table 5. The frequency channel number corresponds to a minimum frequency, as shown in the second column in the following Table 5. A frequency band corresponding to the frequency channel number may be known from the minimum frequency. For example, a frequency band corresponding to a frequency channel number 38 is a 2.6 G frequency band, and a frequency band corresponding to a frequency channel number 40 is a 2.3 G frequency band. Both the frequency band and the frequency channel number are used to refer in particular to a frequency segment. The frequency is a number assigned to a fixed frequency, and is generally a center frequency of a modulated signal. For example, if all frequency intervals are 200 KHz, the frequencies are 890 MHz, 890.2 MHz, 890.4 MHz, 890.6 MHz, 890.8 MHz, 891 MHz, . . . , and 915 MHz based on the frequency interval of 200 KHz. Each of these points is a frequency, and represents a frequency range from 100 KHz above the point to 100 KHz below the point.

TABLE 5

| Frequency channel number | $F_{DL\_Low}$ minimum frequency [MHz] | Frequency $N_{DL}$ range [MHz] |
|---|---|---|
| 1 | 2110 | 0-599 |
| ... | ... | ... |
| 38 | 2570 | 37750-38249 |
| 39 | 1880 | 38250-38649 |
| 40 | 2300 | 38650-39649 |

In the following descriptions of FIG. 3 to FIG. 10, an example in which a radio resource is a frequency or a frequency band is used for description.

For example, the network device that determines the first information may be a PCF, an AMF, or a RAN.

Step 202: The network device sends the first information to a terminal device. Correspondingly, the terminal device receives the first information from the network device.

Step 203: The terminal device accesses the first network slice based on the first information by using the first radio resource.

For example, the terminal device determines, based on the received first information, a requested network slice with reference to a service requirement of the terminal device, and accesses the network slice by using the radio resource corresponding to the network slice.

Therefore, according to the method in this embodiment of this application, the terminal device may learn of a relationship between different network slices and radio resources corresponding to the different network slices. When accessing a network slice, the terminal device can access a requested network slice based on the information by using a correct radio resource, so that a slice access success rate can be ensured, and user experience can be improved. For example, with reference to the example in Table 2, if the terminal device accesses an eMBB-type slice by using 2.6 GHz last time, and then enters an idle mode, when the terminal device enters a connected mode again and wants to request a URLLC-type slice, the terminal device can access the URLLC-type slice by using 4.9 GHz based on received information, so that a problem in a current technology is avoided.

Optionally, the first information further includes a correspondence between location information of the terminal device and both the identification information of the first network slice and the information about the first radio resource, as shown in Table 6.

TABLE 6

| Area 1 | Identification information of the first network slice | Information about the first radio resource for accessing the first network slice |
|---|---|---|
| Area 2 | Identification information of a second network slice | Information about a second radio resource for accessing the second network slice |

For example, the location information includes tracking area (TA) information (for example, information about a TA in which the terminal device is located), cell information (for example, information about a cell in which the terminal device is located), or base station information (RAN Node ID). For example, a base station may be a base station serving the terminal device, or may be a base station that supports a slice to which the UE subscribes. Therefore, the terminal device may further learn of a relationship between different network slices in different areas and radio resources corresponding to the network slices. When accessing a network slice at different locations, the terminal device may access the requested network slice based on the information by using the correct radio resource, so that the slice access success rate can be ensured, and user experience can be improved. For example, with reference to the example in Table 3, the eMBB only terminal device accesses the network through 2.6 GHz in the area 1 last time and then enters the idle mode. When the terminal device moves from the area 1 to the area 2 and enters the connected mode again, the terminal device can access an eMBB slice in the area 2 through 4.9 GHz based on the received information, so that the problem in the current technology is avoided.

Optionally, the first network slice herein may be all slices in a PLMN, or a slice requested by the terminal device (requested NSSAI), a slice subscribed to by the terminal device (subscribed NSSAI), or a slice configured by the terminal device (configured NSSAI). In other words, the network device may obtain all slices in the PLMN and radio resources corresponding to the slices. However, based on the requested NSSAI, the subscribed NSSAI, or the configured NSSAI, the network device sends, to the terminal device, only a radio resource corresponding to the requested NSSAI, the subscribed NSSAI, or the configured NSSAI, so that network resources are saved.

For example, for the foregoing step 201, the network device that determines the first information may be a PCF, an AMF, or a RAN.

Figure 3:
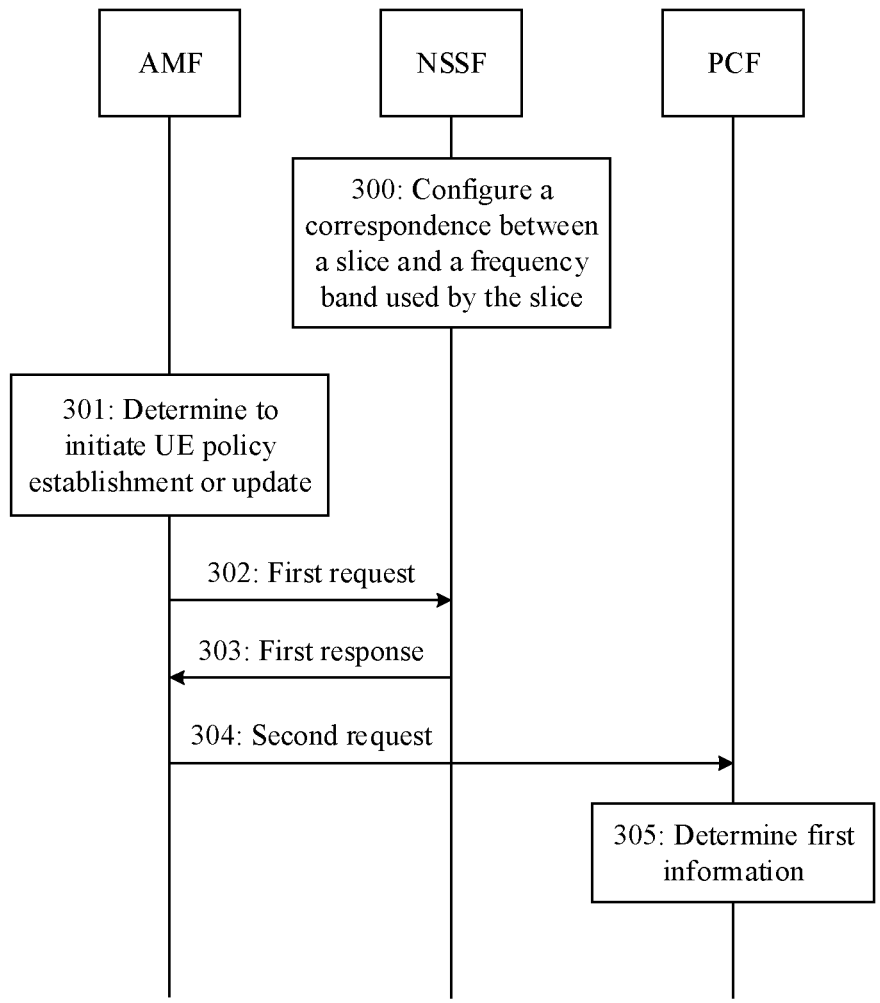
FIG. 3 is a signaling interaction diagram of determining first information by a PCF according to an embodiment of this application.

A: When the network device is a PCF, the first information may be determined in any one of the following manners A1 to A4:

A1: The AMF obtains, from the NSSF, frequency information corresponding to the slice, and sends the frequency information corresponding to the slice to the PCF. In this scenario, it is considered that a correspondence between a slice and a frequency band of an entire PLMN is configured on the NSSF network element. When initiating a UE policy establishment or update procedure, the AMF may obtain the correspondence between the slice and the frequency band of the entire PLMN from the NSSF. Alternatively, the AMF may request, from the NSSF, a correspondence between a slice and a frequency band around a location of the UE (of a base station or a TA around the UE). Alternatively, the AMF obtains the correspondence between the slice and the frequency band of the entire PLMN from operations, administration and maintenance (OAM) and then reports the correspondence to the PCF. As shown in FIG. 3:

Step 300: A correspondence between a slice and a frequency band used by the slice is configured on the NSSF network element. Herein, it is assumed that a correspondence between slices and frequency bands of all TAs (or base stations) in the entire PLMN is configured on the NSSF network element.

Step 301: The AMF determines to deliver the UE policy.

Step 302: The AMF sends a first request to the NSSF. For example, the AMF may send the first request to the NSSF by invoking a service (Nnssf_NSSelection_Get) of the NSSF.

Step 303: The AMF receives a first response from the NSSF. For example, the NSSF returns an Nnssf_NSSelection_Get response to the AMF.

In a possible implementation, the first response may include the correspondence between the slices and the frequency bands of all the TAs (or base stations) in the entire PLMN.

Optionally, in another implementation, the first request in step 302 includes location information of the UE. For example, the location information of the UE is a cell identifier (Cell ID) on which the UE camps or a base station identifier. The cell identifier or the base station identifier may be stored in the AMF as a UE context. Optionally, the location information of the UE may further include an identifier of a neighboring base station or an identifier of another base station in a same TA. For example, the AMF may locally configure a topology relationship between the TA and the base station or query the UDR to obtain the topology relationship. In this way, the AMF may request, from the NSSF, a correspondence between a slice near the UE and a frequency band used by the slice. Correspondingly, the NSSF may return the correspondence between the slice near the UE and the frequency band used by the slice to the AMF based on the location information of the UE in step 303.

Step 304: The AMF sends a second request to the PCF. For example, the second request may be a UE policy establishment request or a UE policy update request. For example, the AMF may send the second request to the PCF by invoking a service (Npcf_UEPolicyControl_Establishment/Update) of the PCF.

In a possible implementation, the AMF receives the correspondence between the slices and the frequency bands of all the TAs (or base stations) in the entire PLMN, and sends the correspondence between the slices and the frequency bands of all the TAs (or base stations) in the entire PLMN to the PCF.

In another possible implementation, the AMF receives the correspondence between the slices and the frequency bands of all the TAs (or base stations) in the entire PLMN. Then, the AMF determines, based on the location information of the UE, the correspondence between the slice near the UE and the frequency band used by the slice, and then sends the correspondence between the slice near the UE and the frequency band used by the slice to the PCF.

In still another possible implementation, the AMF receives the correspondence between the slice near the UE and the frequency band used by the slice, and sends the correspondence between the slice near the UE and the frequency band used by the slice to the PCF.

Correspondingly, the PCF receives, from the AMF, the correspondence between the slices and the frequency bands of all the TAs (or base stations) in the entire PLMN or the correspondence between the slice near the UE and the frequency band used by the slice.

Step 305: The PCF determines the first information based on information received from the AMF.

When the PCF receives, from the AMF, the correspondence between the slices and the frequency bands of all the TAs (or base stations) in the entire PLMN, the PCF may determine the correspondence between the slice near the UE and the frequency band used by the slice based on the correspondence and the location information of the UE that is obtained from the AMF. The correspondence between the slice near the UE and the frequency band used by the slice includes the first information.

Alternatively, the PCF may directly receive, from the AMF, the correspondence between the slice near the UE and the frequency band used by the slice. The correspondence between the slice near the UE and the frequency band used by the slice includes the first information.

In other words, the NSSF may determine the correspondence between the slice near the UE and the frequency band used by the slice, and then send the correspondence to the PCF by using the AMF; or the AMF may obtain a correspondence of an entire network, and determine the correspondence between the slice near the UE and the frequency band used by the slice, and send the determined correspondence to the PCF; or the PCF may obtain a correspondence of an entire network, and determine the correspondence between the slice near the UE and the frequency band used by the slice.

Figure 4:
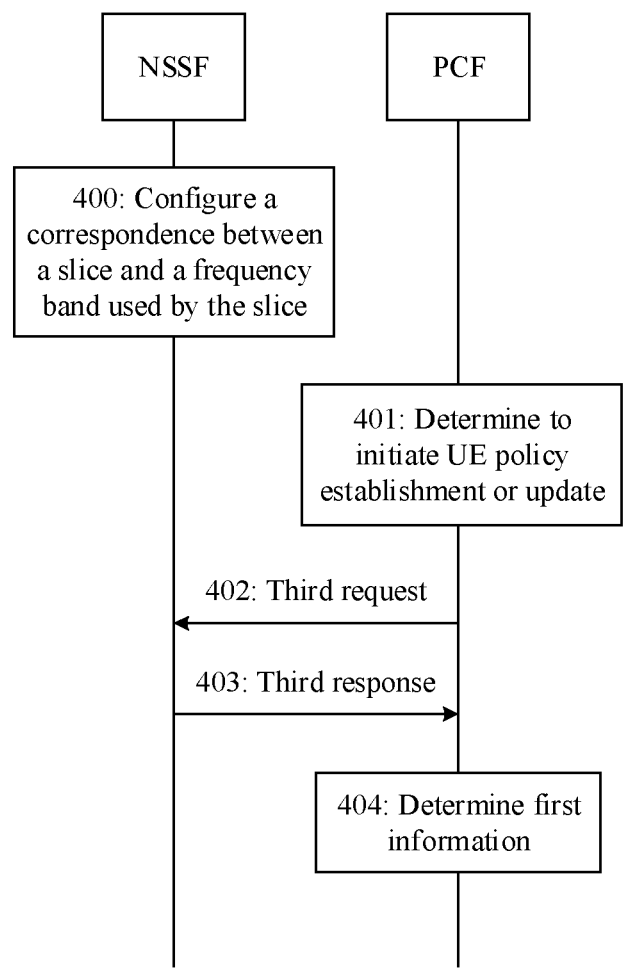
FIG. 4 is a signaling interaction diagram of determining first information by a PCF according to an embodiment of this application.

A2: The PCF obtains, from the NSSF, the frequency information corresponding to the slice. In this scenario, it is considered that the correspondence between the slice and the frequency band of the entire PLMN is configured on the NSSF network element. When initiating the UE policy establishment or update procedure, the PCF may obtain the correspondence between the slice and the frequency band of the entire PLMN from the NSSF. Alternatively, the PCF may request, from the NSSF, the correspondence between the slice and the frequency band around the location of the UE (of the base station or the TA around the UE). As shown in FIG. 4:

Step 400: The correspondence between the slice and the frequency band used by the slice is configured on the NSSF network element. Herein, it is assumed that the correspondence between the slices and the frequency bands of all the TAs (or base stations) in the entire PLMN is configured on the NSSF network element.

Step 401: The PCF determines to deliver the UE policy.

Step 402: The PCF sends a third request to the NSSF. For example, the PCF may send the third request to the NSSF by invoking the service (Nnssf_NSSelection_Get) of the NSSF.

Step 403: The PCF receives a third response from the NSSF. For example, the NSSF returns an Nnssf_NSSelection_Get response to the PCF.

In a possible implementation, the third response may include the correspondence between the slices and the frequency bands of all the TAs (or base stations) in the entire PLMN.

Optionally, in another implementation, the PCF obtains the location information of the UE from the AMF, and the third request in step 402 includes the location information of the UE. For the location information of the UE, refer to the descriptions in FIG. 3. In this way, the PCF may request, from the NSSF, the correspondence between the slice near the UE and the frequency band used by the slice. Correspondingly, the NSSF may return the correspondence between the slice near the UE and the frequency band used by the slice to the PCF based on the location information of the UE in step 403.

Correspondingly, the PCF receives, from the NSSF, the correspondence between the slices and the frequency bands of all the TAs (or base stations) in the entire PLMN or the correspondence between the slice near the UE and the frequency band used by the slice.

Step 404: The PCF determines the first information based on the information received from the NSSF.

When the PCF receives the correspondence between the slices and the frequency bands of all the TAs (or base stations) in the entire PLMN, the PCF may determine the correspondence between the slice near the UE and the frequency band used by the slice based on the correspondence and the location information of the UE that is obtained from the AMF. The correspondence between the slice near the UE and the frequency band used by the slice includes the first information.

Alternatively, the PCF may directly receive, from the NSSF, the correspondence between the slice near the UE and the frequency band used by the slice. The correspondence between the slice near the UE and the frequency band used by the slice includes the first information.

In other words, the NSSF may determine the correspondence between the slice near the UE and the frequency band used by the slice, and then send the correspondence to the PCF; or the PCF may obtain the correspondence of the entire network, and determine the correspondence between the slice near the UE and the frequency band used by the slice.

Figure 5:
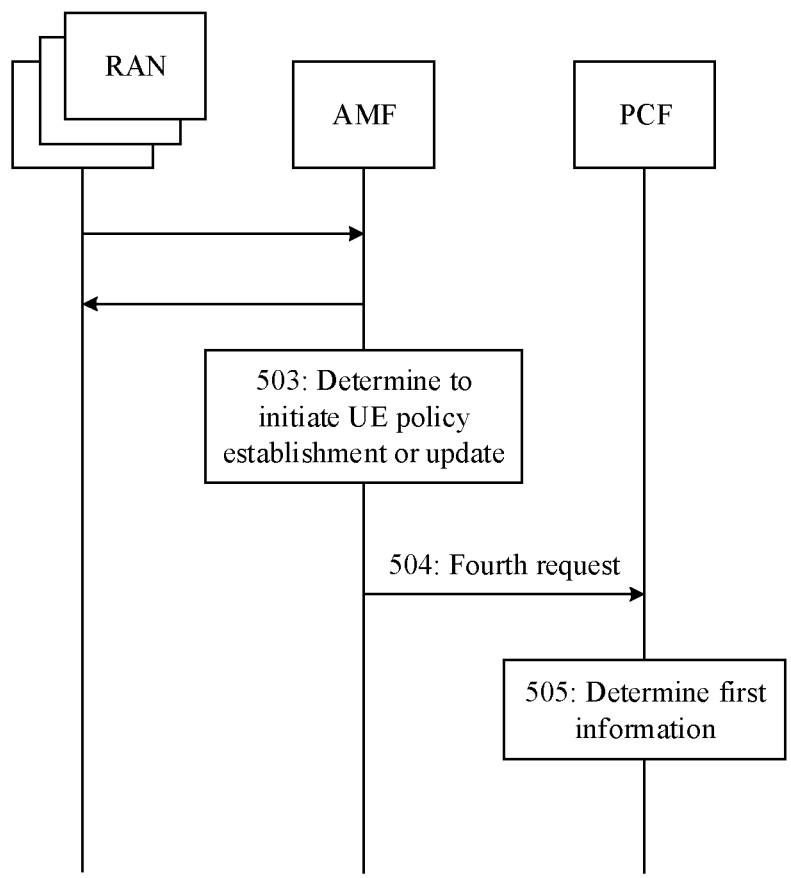
FIG. 5 is a signaling interaction diagram of determining first information by a PCF according to an embodiment of this application.

A3: The AMF obtains, from the RAN, the frequency information corresponding to the slice, and sends the frequency information corresponding to the slice to the PCF. In this scenario, it is considered that in a procedure of setting up an NG interface (NG setup) between the AMF and the RAN, the RAN reports a correspondence between the slice and the frequency information in the RAN to the AMF. The AMF may report the correspondence between the slice and the frequency band around the location of the UE (of the base station or the TA around the UE) to the PCF based on the location information of the UE. As shown in FIG. 5:

Step 501: In the NG setup procedure, the RAN sends an NG setup request to the AMF, where the NG setup request includes a correspondence between a slice and frequency information in the RAN. In other words, the RAN may report the correspondence in Table 6 to the AMF, where the location information uses information about the base station as a granularity.

Step 502: The AMF sends an NG setup response to the RAN.

Step 503: The AMF determines to deliver the UE policy.

Step 504: The AMF sends a fourth request to the PCF. For example, the fourth request may be the UE policy establishment request or the UE policy update request. For example, the AMF may send the fourth request to the PCF by invoking the service (Npcf_UEPolicyControl_Establishment/Update) of the PCF.

For example, because the correspondence that is between the slice and the frequency band and that is obtained by the AMF uses a base station granularity, the AMF may send the correspondence between the slice and the frequency band around the location of the UE to the PCF based on the location information of the UE by using the fourth request. For the location information of the UE, refer to the descriptions in FIG. 3. For example, when the AMF can learn of a topology relationship of the base station around the UE (where the AMF is configured with a physical location topology relationship of all RANs managed by the AMF, or is obtained by querying the UDR), the AMF may report a correspondence between a slice and a frequency band of a neighboring base station to the PCF. Alternatively, the AMF may report a correspondence between a slice and a frequency band of a surrounding TA to the PCF.

Correspondingly, the PCF may obtain the correspondence between the slice and the frequency band around the location of the UE.

Step 505: The PCF determines the first information based on the information received from the NSSF.

For step 505, refer to the descriptions of step 404 in FIG. 4. Details are not described herein again.

Figure 6:
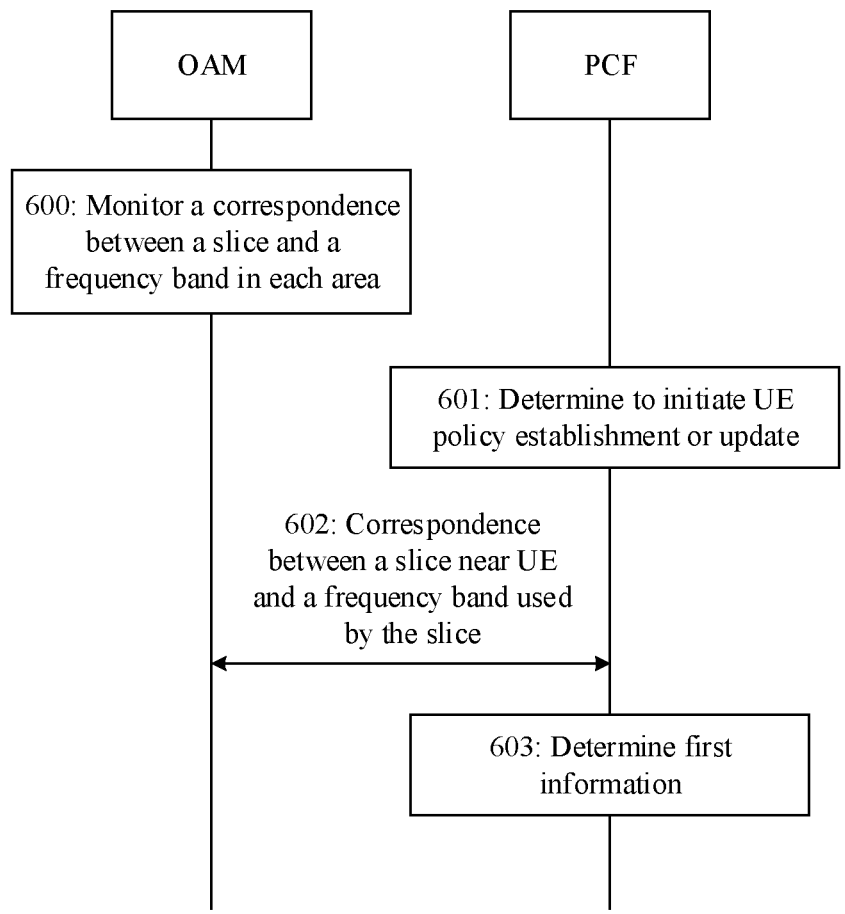
FIG. 6 is a signaling interaction diagram of determining first information by a PCF according to an embodiment of this application.

A4: The PCF obtains, from the OAM, the frequency information corresponding to the slice. In this scenario, it is considered that an OAM-related network element monitors a correspondence between a slice and a frequency band in each area. When initiating the UE policy establishment or update procedure, the PCF may obtain the correspondence between the slice and the frequency band of the entire PLMN from the OAM. Alternatively, the PCF may request, from the OAM, the correspondence between the slice and the frequency band around the location of the UE (of the base station or the TA around the UE). As shown in FIG. 6:

Step 600: The OAM-related network element monitors the correspondence between the slice and the frequency band in each area.

Step 601: The PCF determines to deliver the UE policy.

Step 602: The PCF requests, from the OAM based on the location information of the UE, the correspondence between the slice near the UE and the frequency band used by the slice. For example, the PCF may query for a correspondence of the base station granularity or a TA granularity. For the location information of the UE, refer to the descriptions in FIG. 3.

Step 603: The PCF determines the first information.

For any one of the foregoing manners, as described above, the correspondence received by the PCF/AMF may be different from the correspondence delivered by the PCF/AMF. The correspondence received by the PCF/AMF may be second information, and the delivered correspondence may be the first information. The second information includes at least information about a radio resource corresponding to the first slice, and may further include information about a radio resource corresponding to another slice. For example, the correspondence received by the PCF/AMF is a correspondence of the entire network, and the delivered correspondence is a correspondence between the slice near the UE and a radio resource used by the slice. In addition, the PCF/AMF may further determine and deliver a correspondence between a slice requested by the UE, a slice subscribed to by the UE, or a slice configured by the UE and a radio resource used by the slice, with reference to the slice requested by the UE, the slice subscribed to by the UE, or the slice configured by the UE.

Optionally, after the PCF determines the first information in any one of the foregoing manners, the PCF may generate policy information, for example, a new UE policy including the foregoing correspondence, and directly send the UE policy to the UE. The UE policy may be included in a UE route selection policy (UE route selection policy, URSP), or may be independently used as a policy. Alternatively, the PCF may generate a RAT/frequency selection priority (RAT/Frequency Selection Priority, RFSP) or another access and mobility policy (access and mobility policy, AM policy) that includes the foregoing correspondence, and send the RFSP or the another AM policy to the AMF; and then the AMF or the AN sends the correspondence to the UE.

B: When the network device is an AMF, the first information may be determined in the following manner:

B1: The AMF obtains, from the NSSF, the frequency information corresponding to the slice, as described in step 300 to step 303 in FIG. 3, and details are not described herein again.

B2: The AMF obtains, from the RAN, the frequency information corresponding to the slice, as described in step 501 and step 502 in FIG. 5, and details are not described herein again.

C: When the network device is a RAN, the first information may be determined in the following manner:

When the PCF/AMF sends the correspondence of the entire network or the correspondence between the slice near the UE and the frequency band used by the slice to the RAN, the RAN may determine and deliver, based on the slice requested by the UE, a correspondence between the slice requested by the UE and the frequency band used by the slice. In other words, the RAN may further determine, based on the correspondence obtained from the PCF/AMF, the correspondence between the slice requested by the UE and the frequency band used by the slice, and send the correspondence to the UE by using an access stratum (access stratum, AS) message. For example, the RAN may send, to the UE by using system information block (system information block, SIB) information in the AS message, the correspondence between the slice requested by the UE and the frequency band used by the slice.

Certainly, it may be understood that the PCF/AMF may send the correspondence between the slice and the frequency band used by the slice to the UE by using a non-access stratum (non-access stratum, NAS) message.

Figure 7:
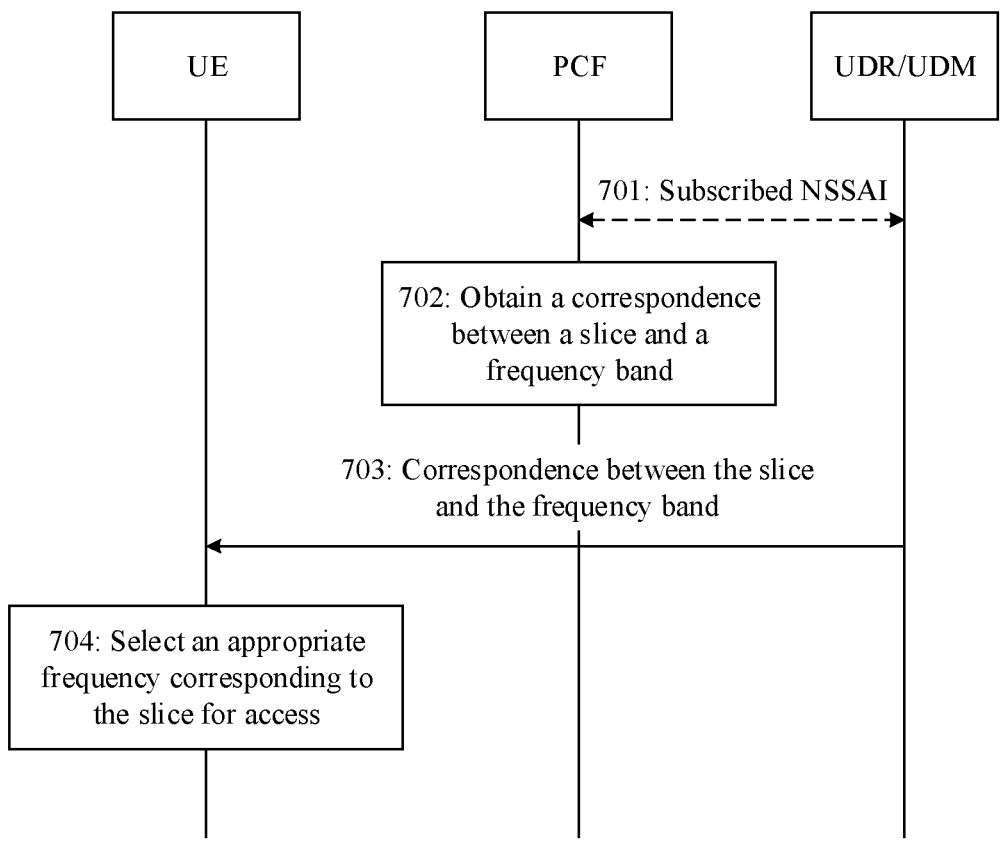
FIG. 7 is a signaling interaction diagram of a communication method according to an embodiment of this application.

FIG. 7 is a signaling interaction diagram of a communication method according to an embodiment of this application. For example, the method includes the following steps:

Step 701: A PCF obtains information about subscribed NSSAI of UE from a UDR/UDM.

Step 701 is an optional step.

Step 702: The PCF obtains a correspondence between a slice and a frequency band.

The correspondence between the slice and the frequency band may be in a format of Table 4 or Table 6. For example, an eMBB slice needs to use a 4.9 GHz frequency band. Optionally, when the correspondence further includes location information, an eMBB slice of a specific location (TA, Cell) needs to use the 4.9 GHz frequency band.

For a manner of obtaining the correspondence between the slice and the frequency band by the PCF, refer to the foregoing descriptions of FIG. 3 to FIG. 6. Details are not described herein again.

Optionally, when step 701 is performed, the PCF may obtain only a correspondence related to the subscribed NSSAI of the UE. Certainly, the correspondence may include a frequency required when a plurality of slices are simultaneously accessed. For example, when an allowed NSSAI includes a plurality of S-NSSAI and a user has a requirement, the UE may access the plurality of slices at the same time.

Step 703: The PCF sends the correspondence between the slice and the frequency/frequency band to the UE.

Step 704: The UE selects, based on information about a slice that needs to be requested by the UE, an appropriate frequency corresponding to the slice for access.

Optionally, when performing access, the UE may further consider another factor such as signal strength, to select the appropriate frequency corresponding to the slice for access.

It should be noted that the method steps in this embodiment may be performed after a procedure in which a network establishes a UE policy association for the UE, or may be performed in a process of the procedure. This is not limited in this application.

Figure 8:
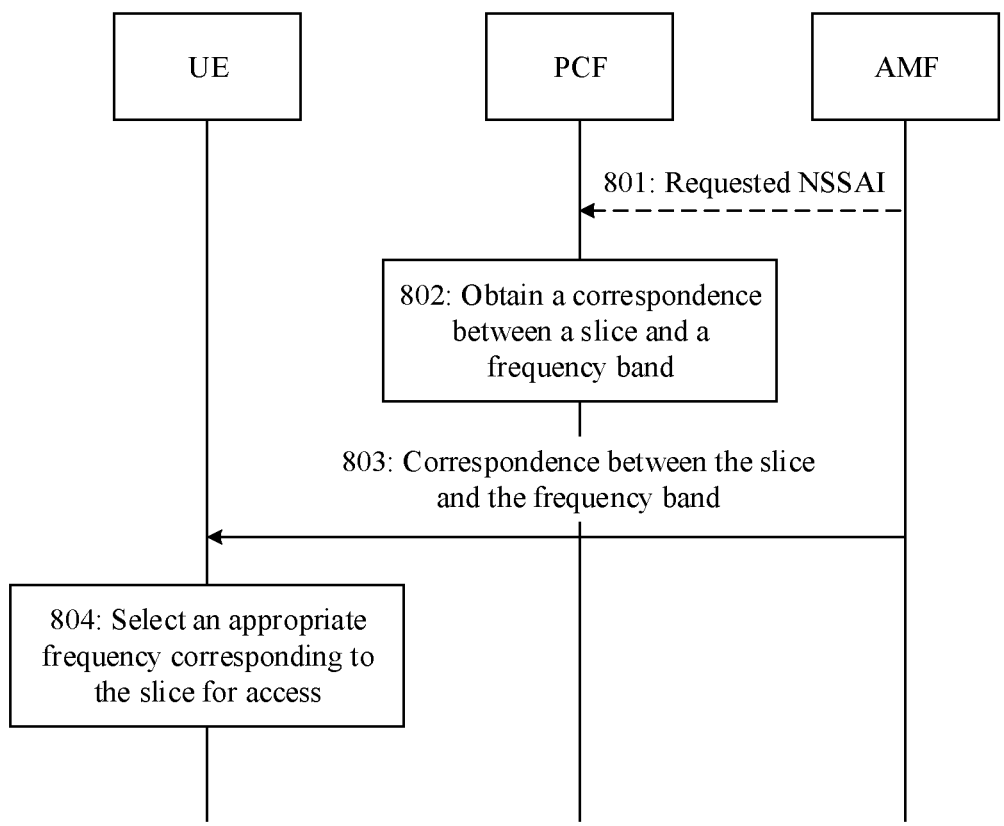
FIG. 8 is a signaling interaction diagram of a communication method according to an embodiment of this application.

FIG. 8 is a signaling interaction diagram of a communication method according to an embodiment of this application. Similarly, the method steps in the embodiment in FIG. 8 may be performed after a procedure in which a network establishes a UE policy association for the UE, or may be performed in a process of the procedure. This is not limited in this application. For example, the method includes the following steps:

Step 801: A PCF obtains information about requested NSSAI of UE from an AMF.

For example, the AMF may report the information about the requested NSSAI of the UE in a policy association establishment request in the UE policy association procedure, or may report the information about the requested NSSAI of the UE in another procedure. For example, the PCF may set, in the AMF, a condition of a policy control request trigger (PCR Trigger): Request NSSAI change. In other words, after enabling the AMF to obtain updated request NSSAI, the PCF needs to report the updated request NSSAI to the PCF.

Step 801 is an optional step.

Step 802: The PCF obtains a correspondence between a slice and a frequency band.

The correspondence between the slice and the frequency band may be in a format of Table 4 or Table 6.

For a manner of obtaining the correspondence between the slice and the frequency band by the PCF, refer to the foregoing descriptions of FIG. 3 to FIG. 6. Details are not described herein again.

Optionally, when step 801 is performed, the PCF may obtain only a correspondence related to the requested NSSAI of the UE. Certainly, the correspondence may include a frequency required when a plurality of slices are simultaneously accessed. For example, when an allowed NSSAI includes a plurality of S-NSSAI and a user has a requirement, the UE may access the plurality of slices at the same time.

Step 803: The PCF sends the correspondence between the slice and the frequency/frequency band to the UE.

Step 804: The UE selects, based on information about a slice that needs to be requested by the UE, an appropriate frequency corresponding to the slice for access.

Optionally, when performing access, the UE may further consider another factor such as signal strength, to select the appropriate frequency corresponding to the slice for access.

Figure 9:
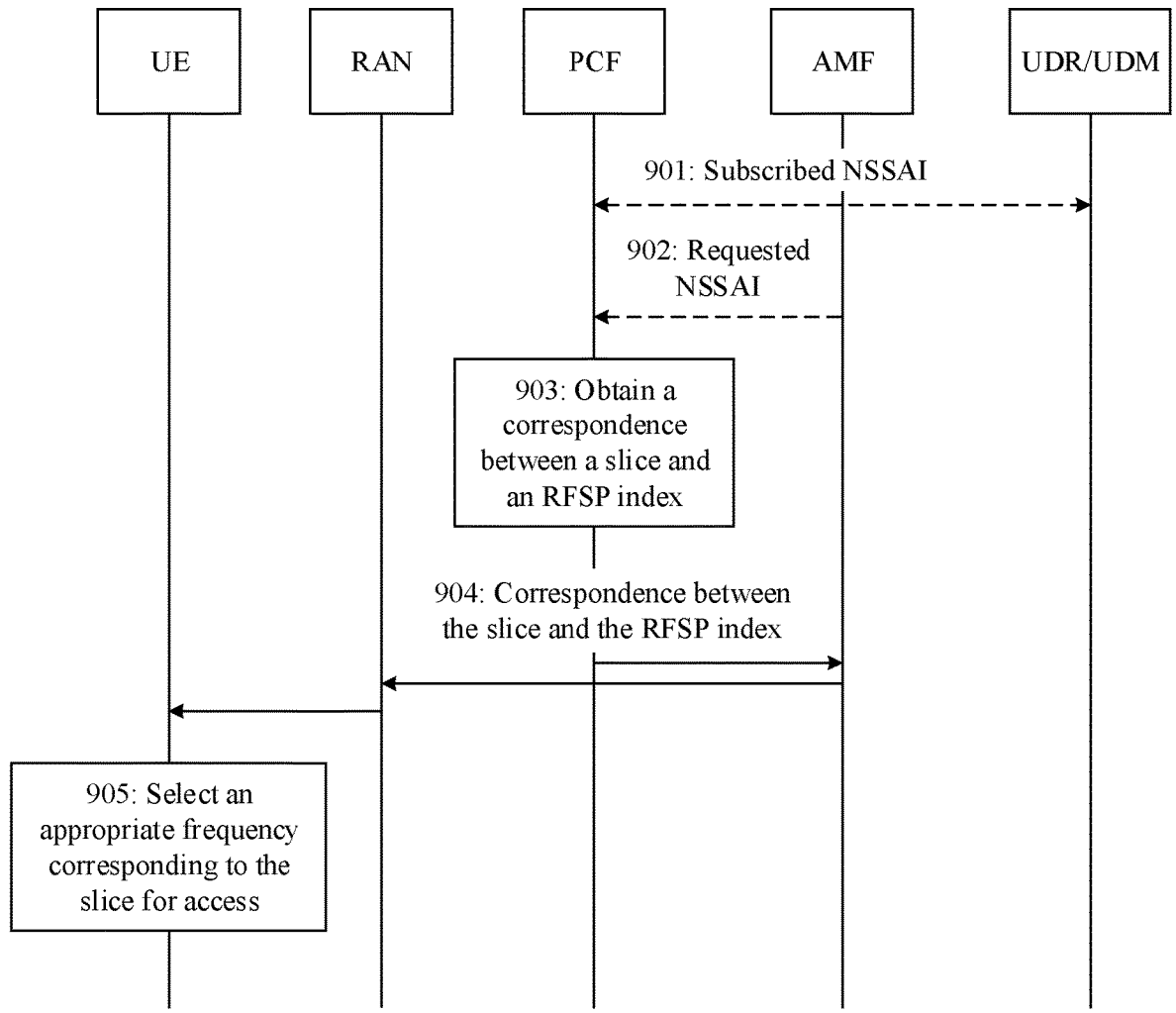
FIG. 9 is a signaling interaction diagram of a communication method according to an embodiment of this application.

FIG. 9 is a signaling interaction diagram of a communication method according to an embodiment of this application. Similarly, the method steps in the embodiment in FIG. 9 may be performed after a procedure in which a network establishes a UE policy association for the UE, or may be performed in a process of the procedure. This is not limited in this application. For example, the method includes the following steps:

Step 901: A PCF obtains information about requested NSSAI of UE from an AMF.

For step 901, refer to the descriptions of step 801 in FIG. 8. Details are not described herein again.

Step 902: A PCF obtains information about subscribed NSSAI of UE from a UDR/UDM.

Steps 901 and step 902 are optional steps, and any one of the steps may be performed, or both of the steps are performed, or neither of the steps is performed.

Step 903: The PCF obtains a correspondence between a slice and a frequency band.

The correspondence between the slice and the frequency band may be in a format of Table 4 or Table 6.

For a manner of obtaining the correspondence between the slice and the frequency band by the PCF, refer to the foregoing descriptions of FIG. 3 to FIG. 6. Details are not described herein again.

In addition, the PCF converts frequency band information into an RFSP index (RFSP index), and generates a correspondence shown in Table 7.

TABLE 7

| Location information (optional) | Identification information of a network slice | Frequency information |
|---|---|---|
| Area 1 | eMBB | RFSP index 1 |
| Area 1 | URLLC | RFSP index 2 |
| Area 2 | eMBB | RFSP index 2 |

For example, an eMBB slice needs to use a frequency band (representing 4.9 GHz) corresponding to the RFSP index 1. Optionally, when the correspondence further includes the location information, 4.9 GHz corresponding to the RFSP index 1 needs to be used for an eMBB slice in a specific location (the area 1). An eMBB slice in the area 2 needs to use 2.6 GHz corresponding to the RFSP index 2.

Optionally, when step 901 or step 902 is performed, the PCF may obtain only a correspondence related to requested NSSAI or subscribed NSSAI of the UE. Certainly, the correspondence may include index information of a frequency required when a plurality of slices are simultaneously accessed. For example, when an allowed NSSAI includes a plurality of S-NSSAI and a user has a requirement, the UE may access the plurality of slices at the same time.

Step 904: The PCF sends a correspondence between the slice and the RFSP index to the UE.

Optionally, the PCF may first send the correspondence to the AMF, for example, send the correspondence to the AMF in a form of a tuple in Table 7, and then the AMF sends the correspondence to the RAN. In an implementation, the RAN forwards the correspondence to the UE. In another implementation, the RAN may alternatively determine, with reference to the requested NSSAI of the UE, an RFSP index corresponding to the requested NSSAI of the UE, and send, to the UE (for example, by using the SIB), an AS stratum message including the RFSP index corresponding to the requested NSSAI of the UE.

Step 905: The UE selects, based on information about a slice that needs to be requested by the UE, an appropriate frequency corresponding to the slice for access.

Optionally, when performing access, the UE may further consider another factor such as signal strength, to select the appropriate frequency corresponding to the slice for access.

Figure 10:
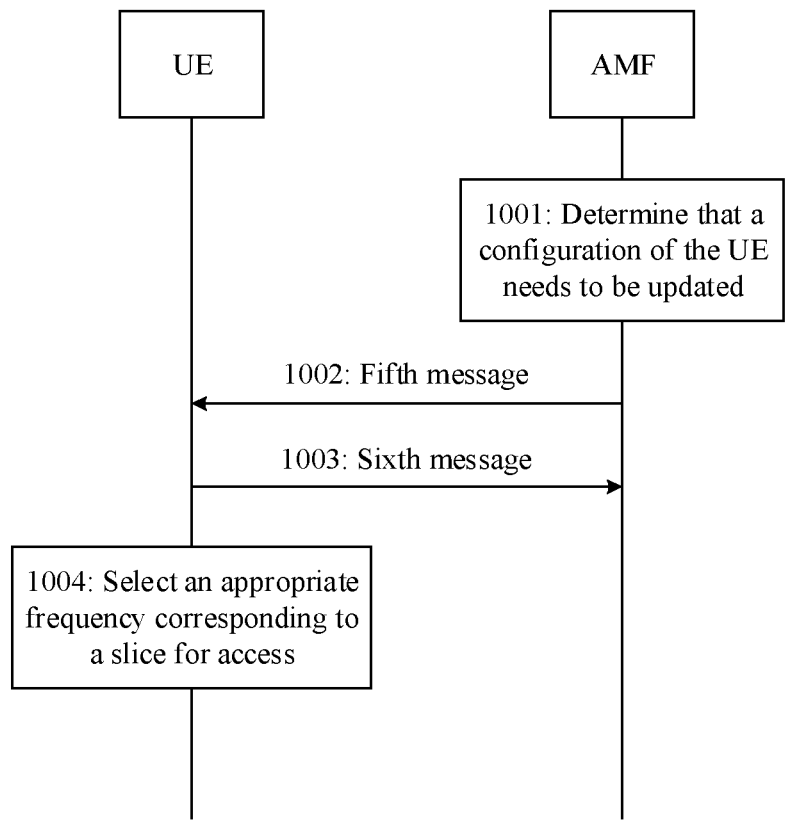
FIG. 10 is a signaling interaction diagram of a communication method according to an embodiment of this application.

FIG. 10 is a signaling interaction diagram of a communication method according to an embodiment of this application. For example, the embodiment in FIG. 10 may be used in a user configuration update (UCU) procedure. The method includes the following steps.

Step 1001: An AMF determines that a configuration of UE needs to be updated.

For example, when finding that a frequency band corresponding to a slice needs to be updated, the AMF determines that the configuration of the UE needs to be updated.

In this step, the AMF obtains a correspondence between a slice configured by the UE and a frequency band. For example, configured slice information may be configured on the AMF, or the AMF may obtain configured slice information from an NSSF. The correspondence between the configured slice and the frequency band may be in a format of Table 4, Table 6, or Table 7.

Step 1002: The AMF sends a fifth message to the UE. The fifth message includes the correspondence between the slice configured by the UE and the frequency band. For example, the fifth message is a UE configuration update command message.

Step 1003: The UE sends a sixth message to the AMF. For example, the sixth message is a UE configuration update complete message.

Step 1004: The UE selects, based on information about a slice that needs to be requested by the UE and with reference to the received correspondence, an appropriate frequency corresponding to the slice for access.

Optionally, when performing access, the UE may further consider another factor such as signal strength, to select the appropriate frequency corresponding to the slice for access.

The foregoing mainly describes the solutions provided in embodiments of this application from a perspective of interaction between network elements. Correspondingly, an embodiment of this application further provides a communication apparatus. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
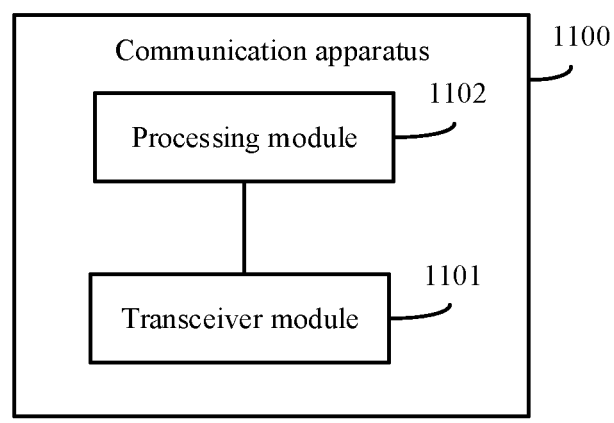
FIG. 11 is a schematic diagram of a structure of a communication device according to an embodiment of this application.

FIG. 11 is a schematic diagram of a structure of a communication apparatus 1100. The communication apparatus 1100 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, or a communication interface. The processing module 1102 may also be referred to as a processing unit configured to implement a processing function, for example, may be a processing circuit, or a processor.

In an embodiment, the communication apparatus may perform operations of the terminal device in FIG. 2 or the UE in FIG. 7 to FIG. 10. For example, the transceiver module 1101 is configured to receive first information from a network device. The first information includes identification information of a first network slice and information about a first radio resource for accessing the first network slice. The processing module 1102 is configured to access the first network slice based on the first information by using the first radio resource.

Optionally, the identification information of the first network slice includes a type of the first network slice, single network slice selection assistance information for identifying the first network slice, or identification information of an instance of the first network slice.

Optionally, the information about the first radio resource indicates a frequency, a frequency, a frequency band, or a spectrum for accessing the first network slice, and the information about the first radio resource includes indication information of the first radio resource or index information of the first radio resource.

Optionally, the first information further includes a correspondence between location information of the terminal device and both the identification information of the first network slice and the information about the first radio resource.

Optionally, the location information includes tracking area information, cell information, or base station information.

Optionally, the first network slice is a network slice requested by the terminal device, a network slice subscribed to by the terminal device, or a network slice configured by the terminal device.

Optionally, the transceiver module 1101 is specifically configured to receive policy information from the network device, where the policy information includes the first information.

In another embodiment, the communication apparatus may perform operations of the network device in FIG. 2 or the PCF, the AMF, or the RAN in FIG. 3 to FIG. 10. For example, the processing module 1102 is configured to determine first information. The first information includes identification information of a first network slice and information about a first radio resource for accessing the first network slice. The transceiver module 1101 is configured to send the first information to a terminal device, where the first information is used by the terminal device to access the first network slice by using the first radio resource.

Optionally, the network device is a policy control function device. For example, that a network device determines first information includes:

The policy control function device receives second information from an access and mobility management function device, and determines the first information based on the second information, where the second information includes the identification information of the first network slice and the information about the first radio resource for accessing the first network slice.

Alternatively, the policy control function device sends location information of the terminal device to a network slice selection function device, receives second information from the network slice selection function device, and determines the first information based on the second information, where the second information includes the identification information of the first network slice and the information about the first radio resource for accessing the first network slice.

The first network slice is capable of providing a service for the terminal device at a location of the terminal device.

Optionally, the network device is an access and mobility management function device. For example, that a network device determines first information includes:

The access and mobility management function device sends location information of the terminal device to a network slice selection function device, receives second information from the network slice selection function device, and determines the first information based on the second information, where the second information includes the identification information of the first network slice and the information about the first radio resource for accessing the first network slice. The first network slice is capable of providing a service for the terminal device at a location of the terminal device.

The access and mobility management function device receives the first information from an access network device.

Optionally, the network device is an access network device. For example, that a network device determines first information includes:

The access network device receives third information from an access and mobility management network element, where the third information includes a correspondence between the identification information of the first network slice and the information about the first radio resource for accessing first network slice, and a correspondence between identification information of a second network slice and information about a second radio resource for accessing the second network slice.

The access network device determines that the terminal device requests to access the first network slice, and determines the first information based on the third information.

Optionally, the identification information of the first network slice includes a type of the first network slice, single network slice selection assistance information for identifying the first network slice, or identification information of an instance of the first network slice.

Optionally, the information about the first radio resource indicates a frequency, a frequency, a frequency band, or a spectrum for accessing the first network slice, and the information about the first radio resource includes indication information of the first radio resource or index information of the first radio resource.

Optionally, the first information further includes a correspondence between location information of the terminal device and both the identification information of the first network slice and the information about the first radio resource.

Optionally, the location information includes tracking area information, cell information, or base station information.

Optionally, the first network slice is a network slice requested by the terminal device, a network slice subscribed to by the terminal device, or a network slice configured by the terminal device.

In addition, all related content of the steps in the foregoing method embodiments may be cited in function descriptions of the corresponding functional modules. Details are not described herein again.

In this embodiment, the communication apparatus 1100 is presented in a form of functional modules obtained through integration. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 1100 may be in a form of a communication apparatus 1200 shown in FIG. 12.

Figure 12:
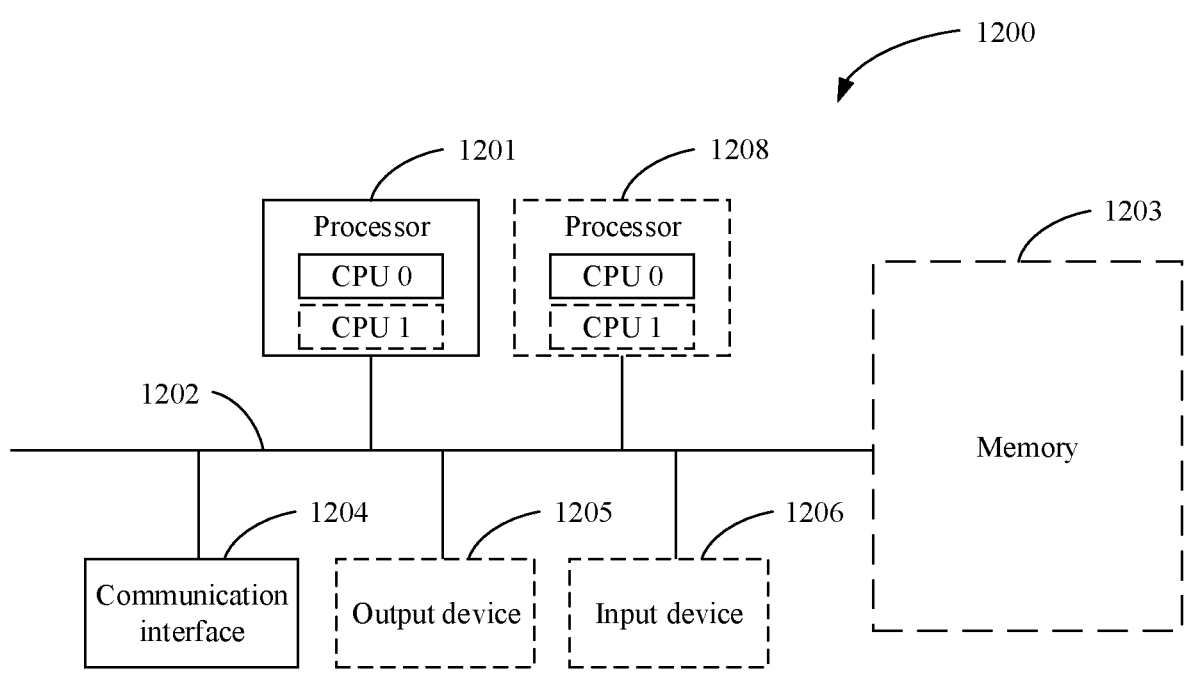
FIG. 12 is a schematic diagram of a structure of a communication device according to an embodiment of this application.

For example, the processor 1201 in the communication apparatus 1200 shown in FIG. 12 may invoke the computer-executable instructions stored in the memory 1203, to enable the communication device 1200 to perform the communication method in the foregoing method embodiment.

Specifically, functions/implementation processes of the transceiver module 1101 and the processing module 1102 in FIG. 11 may be implemented by the processor 1201 in the communication apparatus 1200 shown in FIG. 12 by invoking the computer-executable instructions stored in the memory 1203. Alternatively, functions/implementation processes of the processing module 1102 in FIG. 11 may be implemented by the processor 1201 in the communication apparatus 1200 shown in FIG. 12 by invoking the computer-executable instructions stored in the memory 1203. Functions/implementation processes of the transceiver module 1101 in FIG. 11 may be implemented by using the communication interface 1204 in the communication apparatus 1200 shown in FIG. 12.

The communication apparatus 1100 or the communication apparatus 1200 provided in this embodiment can perform the foregoing communication method. Therefore, for a technical effect that can be achieved by the communication apparatus 1100 or the communication apparatus 1200, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid state disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
   receiving, by a terminal device, first information from a network device, wherein:
   the first information comprises identification information of a first network slice and information indicating a first radio resource for accessing the first network slice,
   the first radio resource comprises a frequency, a frequency band, or a spectrum for accessing the first network slice, and
   wherein the first information further comprises a correspondence between location information and both the identification information of the first network slice and the information indicating the first radio resource, wherein the location information comprises tracking area information, cell information, or base station information; and
   accessing, by the terminal device, the first network slice based on the first information by using the first radio resource, wherein the accessing is for either initial access or when switching from an idle mode to a connected mode.

2. The method according to claim 1, wherein the identification information of the first network slice comprises a type of the first network slice, single network slice selection assistance information for identifying the first network slice, or identification information of an instance of the first network slice.

3. The method according to claim 1, wherein the information indicating the first radio resource indicates a frequency, a frequency band, or a spectrum for accessing the first network slice, and the information indicating the first radio resource comprises indication information of the first radio resource or index information of the first radio resource.

4. The method according to claim 1, wherein the first network slice is a network slice requested by the terminal device, a network slice subscribed to by the terminal device, or a network slice configured by the terminal device.

5. The method according to claim 1, wherein the receiving, by a terminal device, first information from a network device comprises:
   receiving, by the terminal device, policy information from the network device, wherein the policy information comprises the first information.

6. A communication apparatus, comprising a processor, a receiver, and a transmitter, the apparatus configured to:
   receive first information from a network device, wherein;
   the first information comprises identification information of a first network slice and information indicating a first radio resource for accessing the first network slice,
   the first radio resource comprises a frequency, a frequency band, or a spectrum for accessing the first network slice, and
   wherein the first information further comprises a correspondence between location information and both the identification information of the first network slice and the information indicating the first radio resource, wherein the location information comprises tracking area information, cell information, or base station information; and
   access the first network slice based on the first information by using the first radio resource, wherein the accessing is for either initial access or when switching from an idle mode to a connected mode.

7. The apparatus according to claim 6, wherein the receiver is configured to receive policy information from the network device, and the policy information comprises the first information.

8. The apparatus according to claim 6, wherein the identification information of the first network slice comprises a type of the first network slice, single network slice selection assistance information for identifying the first network slice, or identification information of an instance of the first network slice.

9. The apparatus according to claim 6, wherein the information indicating the first radio resource indicates a frequency, a frequency band, or a spectrum for accessing the first network slice, and the information indicating the first radio resource comprises indication information of the first radio resource or index information of the first radio resource.

10. The apparatus according to claim 6, wherein the first network slice is a network slice requested by the communication apparatus, a network slice subscribed to by the communication apparatus, or a network slice configured by the communication apparatus.

11. A non-transitory computer readable storage medium comprising instructions that, when executed by a processor in communication with a receiver and transmitter, cause the processor to be configured to:
receive first information from a network device, wherein:
the first information comprises identification information of a first network slice and information indicating a first radio resource for accessing the first network slice,
the first radio resource comprises a frequency, a frequency band, or a spectrum for accessing the first network slice, and
wherein the first information further comprises a correspondence between location information and both the identification information of the first network slice and the information indicating the first radio resource, wherein the location information comprises tracking area information, cell information, or base station information; and
access the first network slice based on the first information by using the first radio resource, wherein the accessing is for either initial access or when switching from an idle mode to a connected mode.

12. The non-transitory computer readable storage medium according to claim 11, wherein the processor is further configured to receive policy information from the network device, and the policy information comprises the first information.

13. The non-transitory computer readable storage medium according to claim 11, wherein the identification information of the first network slice comprises a type of the first network slice, single network slice selection assistance information for identifying the first network slice, or identification information of an instance of the first network slice.

14. The non-transitory computer readable storage medium according to claim 11, wherein the information indicating the first radio resource indicates a frequency, a frequency band, or a spectrum for accessing the first network slice, and the information indicating the first radio resource comprises indication information of the first radio resource or index information of the first radio resource.

15. The non-transitory computer readable storage medium according to claim 11, wherein the first network slice is a network slice requested by a terminal device comprising the processor, a network slice subscribed to by the terminal device, or a network slice configured by the terminal device.

* * * * *